United States Patent [19]

Relyveld

[11] 3,925,545

[45] Dec. 9, 1975

[54] PROCESS FOR PREPARING ADSORBED VACCINES

[75] Inventor: Edgar Hans Relyveld, Paris, France

[73] Assignee: Institut Pasteur, Paris, France

[22] Filed: Mar. 20, 1973

[21] Appl. No.: 342,932

[30] Foreign Application Priority Data

Apr. 6, 1972 France.................................. 72.12036

[52] U.S. Cl......................... 424/92; 424/88; 424/89
[51] Int. Cl.²................... A61K 39/02; A61K 39/06; A61K 39/12; A61K 39/16
[58] Field of Search................................ 424/88–92

[56] References Cited
UNITED STATES PATENTS

| | | | |
|---|---|---|---|
| 2,364,579 | 12/1944 | Wyckoff | 424/89 |
| 3,435,112 | 3/1969 | Kuhns et al. | 424/88 |
| 3,608,071 | 9/1971 | Relyveld et al. | 424/88 |

*Primary Examiner*—Shep K. Rose
*Attorney, Agent, or Firm*—Toren, McGeady and Stanger

[57] ABSTRACT

An improvement in the preparation of a vaccine adsorbed by a gel of calcium phosphate, by contacting an antigen with an aqueous gel obtained by reacting an aqueous solution of dibasic sodium phosphate with an aqueous solution of calcium chloride, wherein the calcium chloride solution is poured as rapidly as possible, within less than 3 minutes, into said phosphate solution, in a proportion substantially equal to 1 mol $PO_4HNa_2$ for 1 mol $CaCl_2$, under stirring; the mixture thus obtained is still stirred while its pH is adjusted to a value very near 7, and the gel formed is subsequently decanted and washed.

7 Claims, No Drawings

PROCESS FOR PREPARING ADSORBED VACCINES

BACKGROUND OF THE INVENTION

The present invention relates to an improved process for the preparation of adsorbed vaccines, notably on calcium phosphate gel. It includes the vaccines adsorbed by a novel gel of this kind.

The advantages of adsorbed vaccines are known. The concentrated form in which they may be present provides the advantage of only requiring a small space for their storage, whilst it is possible to prepare, at any moment, from this form large quantities of vaccines in very little time; this is particularly valuable in the event of epidemics or other immediate necessity; the adsorbed preparations which remain stable for several years enable the control of their dilution products to be considerably reduced, the necessary titrations having been carried out on the concentrated products. For these reasons the adsorbed vaccines have formed the subject of various works, not all of which have led to satisfactory results; in fact, the majority of adsorbants which have been proposed have the drawback that they are irritants, that they badly adsorb the antigens, or that they are difficult to adaptable to an industrial scale. Some progress has been made with the use of a calcium phosphate gel prepared by the known method of Tiselius, that is to say, a gel formed of brushite wherein the phosphate is in the form of $PO_4HCa.2H_2O$. However, even in this form, the gel does not adsorb sufficient antigens in all cases of interest and quite often its harmlessness leaves much to be desired. A further improvement has ameliorated the vaccines adsorbed on calcium phosphate gel, i.e., the one which forms the subject of Belgian Pat. No. 721,141 and which consists in precipitating the phosphate within a medium containing the antigen.

The present invention brings about an improvement in the preparation of a calcium phosphate gel which results in an appreciable improvement over the adsorbed vaccines hitherto prepared. The invention enables very strongly adsorbing gels to be obtained which can lead to highly concentrated and stable vaccines, the injection of which does not cause any irritations or complications. Moreover, the novel calcium phosphate gel according to the invention can be utilised for adsorption after having been prepared and in order to preserve its good qualities, it need no longer be formed within a medium containing the antigen.

The process for preparing a gel of calcium phosphate according to the invention comprises mixing an aqueous solution of bisodium phosphate and an aqueous solution of calcium chloride, characterised in that the solution of calcium chloride is very rapidly introduced, with continuous stirring, into the one of bisodium phosphate. This introduction should be effected as rapidly as possible and in any event in less than three minutes.

The invention results from the surprising observation that the very rapid addition of the calcium salt leads to a calcium phosphate which differs from brushite and from dibasic phosphates which form when an aqueous solution of calcium chloride is gradually added, with stirring, to a solution of bisodium phosphate. In fact, the phosphate which constitutes the gel according to the invention has a chemical composition nearer to tricalcium phosphate $(PO_4)_2Ca_3$ while the phosphates which have hitherto been used for vaccine adsorption had the composition of brushite $PO_4HCa$ or near to this composition. When the mixing is effected at the elevated rate envisaged by the invention, a part of the phosphorus ions remains in solution, the precipitate being richer in calcium than the theory would indicate, even if the proportions of the starting materials, bisodium phosphate and calcium chloride, are equimolar.

The molarity of the solutions used according to the invention may advantageously be between 0.01 and 0.5, preferred values being from 0.05 to 0.1. Within these limits the aqueous solution of calcium chloride can have a concentration differing from that of the bisodium phosphate but its volume is such that in the final mixture there is substantially 1 mol of the one per 1 mol of the other of the reagents.

Although the duration of adding the calcium salt to the bisodium phosphate may be up to approximately three minutes, it is preferable for it not to exceed one minute. Excellent results are obtained when one works with such volumes that it is possible to instantly pour the aqueous solution of $CaCl_2$ into that of bisodium phosphate. Thus, with quantities of the order of 50 l, it is possible to perform the mixing in a time of 2 to 30 seconds.

One practical way of operating consists in placing the solution of bisodium phosphate into a container or pan equipped with stirring means and to rapidly empty into the container, the contents of a reservoir containing the corresponding volume of calcium chloride; during this operation the stirring means are running and stirring is continued after introduction of $CaCl_2$ has been terminated. Especially favourable results are obtained when using a vibrator, but the agitation could also be effected by means of other devices, such as, a vane stirrer or a turbomixer.

A further important characteristic of the new process resides in an adjustment of the pH of the mixture obtained, as soon as possible after addition of the calcium chloride. At this moment the pH is brought to a value equal to or very near 7, more particularly 6.8 to 7.2, the range 7 to 7.2 being preferred. This adjustment is made with the aid of a solution of sodium carbonate the preferred concentration whereof is between 0.1 N and 1 N.

As mentioned above, adjustment of the pH should follow as quickly as possible the introduction of $CaCl_2$ into the aqueous solution of bisodium phosphate; in practice it is desirable for this adjustment to take place in less than 10 minutes after preparation of the mixture. To obtain better results it is preferred for the adjustment of the pH to be immediate, i.e., it should take place during the 30 to 90 seconds following preparation of the mixture. The above described operations are performed at temperatures which may vary between 5° and 40°C; in practice they can be performed at ambient temperature.

The mixture is then left to stand until the clear supernatant volume reaches 80 to 90% of the total volume. This standing may be at ordinary temperature or in the freezer and it generally lasts 6 to 18 hours. The supernatant liquid is then decanted.

Examination of the gel obtained and of the separated liquid shows that all of the initial calcium is to be found in the phosphate precipitate while a portion of the $PO_4$ ions remain in solution in the clear liquid accompany the gel. This latter characteristic is an indication of a precipitate conforming to the present invention which leads to the novel phosphate gel close to tricalcium phosphate possessing the improved properties discussed above.

After decantation of the clear liquid a 0.4% to 0.9% solution of sodium chloride in water is added to the gel, the volume of this solution being of the same order or equal to that of the decanted liquid. The whole is mixed with the aid of a vibrator and again allowed to decant. The fresh layer of clear supernatant liquid is in turn removed and again replaced by a similar solution of sodium chloride. This operation is optionally repeated a third time to complete washing of the gel.

Purification of the gel of calcium phosphate is of great importance. It has, in fact, been observed that the phosphorus ions present in the solution inhibit adsorption of certain antigens. According to the present invention adsorption is ameliorated by elimination of these ions. The elimination is advantageously realised by the above described washing of the gel with a saline solution; preferably the washing is effected by dilution with an aqueous solution of NaCl followed by decantation; the operation is repeated several times if necessary. It is particularly recommended to use a solution of NaCl containing 4 to 9 g of this salt per liter; in fact, the final dilution of the vaccine with such a solution is favourable to the action of the vaccine.

The thus washed final gel generally contains an amount of phosphate such that its phosphorus contents per liter is from 0.3 to 1.5 g and preferably 0.7 to 0.85 g. The overall chemical analysis carried out leads, for the phosphate of the gel, to a composition comprised between those of dicalcium and tricalcium phosphates; in fact one finds molar ratios Ca/PO$_4$ varying between 1.20 and 1.45 and mainly between 1.25 and 1.38 which corresponds to weight ratios Ca/P of 1.55 to 1.90 and mainly 1.62 to 1.85; the ratio Ca/P by weight of brushite, PO$_4$CaH.2H$_2$O being 1.29 and that of (PO$_4$)$_2$Ca$_3$ 1.98 it is apparent that the overall composition of the phosphate of the gel according to the invention lies in the neighbourhood of PO$_4$CaH(PO$_4$)$_2$Ca$_3$ wherein the Ca/P is 1.73 (molar ratio Ca/PO$_4$ = 1.33).

The gel obtained is sterilised in an autoclave at 120°C for one hour whereafter the pH is adjusted to 6.8 to 7.2 and preferably in the range of 7 to 7.2 so as to correct the lowering of the pH towards approximately 6.5 which occurs during sterilisation. It is now ready to serve as adsorbent for various antigens in a manner known per se. It is to be well understood that the term antigen in the present description includes all kinds of substances of microbial secretion, for example the anatoxide, as well as whose microorganisms such as bacteria, viruses or others, or certain of their fractions.

It has been noticed that with the precipitated phosphates according to the invention it is possible to make the gel adsorb one or several different antigens even when this gel has already previously adsorbed another antigen. Thus the present invention comprises also the preparation of mixed vaccines by addition of a calcium phosphate gel which has adsorbed a specific antigen to a solution containing one or several other antigens.

If the rules of precipitation according to the present invention are followed, one or several kinds of antigens may be present in the precipitation medium, more particularly in the starting solution of bisodium phosphate; thus a gel containing adsorbed antigens is directly obtained. After separation of the mother liquors and washings, this gel is capable of additionally adsorbing other antigens; it is thus possible to obtain mixed adsorbed vaccines by successive operations, the first of which is an adsorption in situ during the precipitation and the second an adsorption of already formed gel.

The invention is illustrated, without limitation, by the Examples which follow.

EXAMPLE 1

Preparation of adsorbed antipoliomyelitis vaccines.

To 50 l of an 0.07 M solution of bisodium phosphate, continually stirred by means of a vibrator, 50 l of an 0.07 M solution of calcium chloride are added in 28 seconds; the pH of the mixture is adjusted to 7.1 with a solution of normal sodium carbonate, following the addition of the CaCl$_2$. The 100 l of calcium phosphate gel thus obtained are left to stand until decantation of 85 l of liquid; the clear supernatant liquid is separated by siphoning and replaced by 85 l of aqueous solution of NaCl, 4 g/l.

A second washing is then effected by decantation of the saline liquid and a further addition of 85 l of 4 g NaCl per liter of water. The 100 l of suspension obtained are sterilised at 120°C whereafter their pH is adjusted to 7; the product is left standing and then 85 l of supernatant liquid are decanted.

To 15 l gel remaining at the bottom of the vessel 100 l of an aqueous solution of antipoliomyelitis vaccine are added; the mixture is stirred for 30 minutes with the aid of a vibrator; the 115 l of product are then left standing until decantation of 100 l of clear supernatant; the latter is next separated which leaves 15 l of suspension of calcium phosphate gel having adsorbed the antipoliomyelitis vaccine.

To the latter volume a further portion of 100 l of vaccine is added as on the first occasion. After vibration for 40 minutes a further decantation of 100 l liquid is performed.

To 15 l of suspension of phosphate gel charged with antigens of poliomyelitis remaining after the decantation, a third portion of 100 l of the same antipoliomyelitis vaccine is added as previously. After further vibration for 45 minutes, the product is left to stand and 100 l of supernatant liquid are decanted, leaving 15 l of gel suspension.

The latter thus results from 3 successive adsorptions of vaccine and constitutes a product with a high concentration of the latter. It should be noted that in the course of the above mentioned decantations, the supernatant was always inactive which prooves that the vaccine had been completely adsorbed.

To the 15 l of suspension finally obtained a solution of 85 l of 4 g/l NaCl containing 25 p.p.m. hyamine is added. The mixture is again agitated by means of a vibrator; after standing 85 l of liquid are decanted; to the 15 l of finally obtained gel 85 l of a 4 g/l NaCl solution containing 25 p.p.m. hyamine are added. The resultant vaccine is three times as concentrated as the initial vaccine and it is free of constituents of the culture medium.

As to the contents of calcium phosphate, this corresponds in the 100 l of final product to 0.897 g/l of elementary phosphorus and 1.5 g/l of calcium. Thus the weight ratio Ca/P is 1.68 (atomic ratio 1.292) in the final gel, while at the beginning 1 mol CaCl$_2$ has been used per 1 of PO$_4$HNa$_2$, i.e., weight ratio Ca/P 1.29 (atomic :1); in fact while all the Ca has precipitated, a part of the phosphorus ion remained in solution in the eliminated supernatant; 0.31 g of P per litre of clear liquid of the first decantation were actually found.

EXAMPLE 2

Preparation of an anti-rabies vaccine.

The operations are those of Example 1 but the antipoliomyelitis vaccine is replaced by a viral suspension obtained by culture on sheep's brain. First a homogeneous suspension of brain containing the virus is prepared by grinding or by any other method. After the last decantation of supernatant liquid, the latter is replaced by a solution of 1 g/l of sodium chloride.

Similar preparations are obtained by culture of the virus on the brain of small nice or by cellular culture.

EXAMPLE 3

Preparation of a mixed vaccine

First a suspension of calcium phosphate is prepared in situ in a solution containing anti-diphtheria and anti-tetanus vaccines. The 100 l of suspension thus obtained are left to stand until 4/5 of the liquid is decanted whereafter the clear supernatant liquid is removed. To the remaining suspension of gel 100 l of antipoliomyelitis vaccine solution are added and the whole is stirred for 30 minutes with the aid of a vibrator. After standing to decant the supernantant liquid is again separated. Then a further volume of 100 l of the solution of anti-poliomyelitis vaccine is added, stirring is renewed for half an hour and one decants so as to finally have no more than 20 l of product (this operation may be repeated several times), which is then completed with 80 l of 4 g/l NaCl containing 25 p.p.m. hyamine.

EXAMPLE 4

Preparation of a mixed vaccine

Following the procedure of Example 1 there are prepared 25 l of anti-diphtheria vaccine adsorbed on calcium phosphate, 4 times concentrated, 25 l of anti-tetanus vaccine of the same kind and concentration and 25 l of similar anti-poliomyelitis vaccine. The three volumes of 25 l are mixed and 25 l of calcium phosphate gel obtained as in Example 1 are added to the mixture. The result is a composite antidiphtheria-antitetanus-antipoliomyelitis vaccine adsorbed on calcium phosphate gel.

In another similar operation, the 25 l of phosphate gel are replaced by 25 l of anti-whooping cough vaccine adsorbed on calcium phosphate, 4 times concentrated; a quadruple composite vaccine is thus obtained.

EXAMPLE 5

Mixture with a lyophilised vaccine.

In this preparation, 50 l of gel suspension which has adsorbed anti-diphtheria and anti-tetanus vaccines prepared according to one of the preceding examples are employed for dissolving a lyophilised vaccine. The latter consists of 50,000 doses of lyophilised mild anti-measles vaccine. After dissolution of the lyophilised vaccine, the mixture is ready to be injected.

EXAMPLE 6

Improving an anti-whooping cough vaccine

Anti-whooping cough vaccines frequently contain, even after washing, germs, noxious substances which are badly adsorbed and which, after injection into the organism, can cause secondary reactions. These noxious substances can, moreover, be secreted by the germs during ageing of the vaccine. In order to obviate these drawbacks, the calcium phosphate gel having adsorbed anti-whooping cough vaccine is washed in the following manner.

100 ml of suspension of the adsorbed vaccine are left in a cool chamber for 48 hours. All the clear supernatant liquid is removed and replaced by a saline solution of 9 g NaCl per liter containing a suitable dose of antiseptic. The yellowish supernatant which has been eliminated contained noxious substances; its replacement by the saline solution has rendered the vaccine far more safe and inoffensive.

In another similar preparation the initial suspension was left in the cool chamber for 5 weeks; only then is the above described treatment carried out. In this manner the treatment has not only eliminated the noxious substances which were initially present but also those which the adsorbed microbes had secreted during the 5 weeks of ageing.

EXAMPLE 8

Four preparations of anti-diphtheria vaccine are made under conditions analogous to those of Example 1, the antipoliomyelitis vaccine solution being replaced by that of diphtheria anatoxin. In each case, one works with 1 liter of bisodium phosphate solution of 0.07 to 0.0735 M concentration containing the anatoxin and 1 liter of 0.07 to 0.0735 M $CaCl_2$ solution. The latter is poured into the former with stirring over a period which differs for each of the operations A to D.

A    10 seconds
B    10 minutes
C    20 minutes
D    30 minutes

Following precipitation of the calcium phosphate, the pH of the aqueous suspension obtained is measured and then brought to the identical value of 6.85 in each of the four cases by addition of N NaOH.

The results of determinations of the speed of decantation and of various analyses performed on the suspensions A to D are given below.

pH adjustment of calcium phosphate suspensions.

TABLE I

| Preparation | pH at the end of precipitation | ml of N NaOH required per litre of suspension to bring the pH to 6.85 |
|---|---|---|
| A | 5.7 | 14.8 |
| B | 6.5 | 1.2 |
| C | 6.0 | 7.0 |
| D | 6.05 | 5.2 |

It is apparent that the suspension obtained by an extremely rapid precipitation (A) has the lowest pH. Decantation.

After adjustment of the pH, the speed of decantation is measured on 50 ml of each of the suspension A to D stirred again. These measurements are effected at 20°C in graduated test tubes of 125 mm height (2.5 mm height per ml of capacity). The following levels of clear decanted liquid are found after the interval indicated in table II.

TABLE II

| Times | Level in mm of decanted liquid as function of time | | | |
|---|---|---|---|---|
| | A | B | C | D |
| 5 minutes | 2.5 | 48 | 48 | 57 |
| 10 minutes | 3.8 | 82 | 83 | 89 |
| 20 minutes | 6.3 | 92 | 91 | 95 |
| 1 h 15 | 21.2 | 100 | 95 | 105 |
| 17 hours | 85.0 | 105 | 105 | 109 |

It follows from these measurements that the speed of sedimentation of the suspension (A) of the invention is much slower than that of suspension (B, C, D) prepared in conventional manner, i.e., by progressive addition of $CaCl_2$ to a solution of bisodium phosphate. The decantation of the suspension A is roughly 20 times slower than that of suspensions B, C or D during the first 10 minutes.

Other tests have led to the observation that, according to the invention, the gels of calcium phosphate have improved qualities when their aqueous suspensions, substantially 0.035 molar (about 1.4 g Ca/l and 1.08 g P/l) decant from 1 to 20 mm, and preferably from 2 to 10 mm, during the first ten minutes at 20°C; vaccines which are particularly well adsorbed and easy to inject are obtained with suspensions of type A decanting no more than 6 mm in 10 minutes.

The sedimentation rates of gel A of Table II have virtually not varied after one or two washings, by decantation, of this gel with a solution of 4 g NaCl per litre water. Adsorption capability.

Having adsorbed diphtheria anatoxin during their above described preparation, the suspensions of gels A, B, C, D each titre 120 flocculation units (Uf) per ml. Following their sedimentation, their activity is determined by the flocculation method of Ramon, on the decanted liquid, which gives the following results:

| | |
|---|---|
| A | 0 |
| B | 50 Uf/ml |
| C | 5 Uf/ml |
| D | 7.5 Uf/ml |

It can thus be seen that the phosphates B, C and D leave unadsorbed anatoxin (5 to 50 Uf/ml) while the gel according to the invention adsorbs it integrally.

On the other hand, washing of the gel A by decantation with an aqueous solution of 4 g NaCl per liter does not cause the appearance of the anatoxin in the saline solution, either after one or after two washings.

Contents of Ca and P in the gels obtained.

Analyses of whole suspensions A to D, of the decanted liquids and of the gels themselves have produced the results tabulated in Table III which follows. In this table the contents of Ca and P are expressed in g/litre; that is to say on the one hand for g/liter; stirred, entire suspension as obtained after precipitation and adjustment of the pH to 6.85; on the other hand for the clear liquid separated from the precipitated phosphate by decantation; and finally for a suspension brought back to its initial volume by replacing the decanted liquid by distilled water. The Ca/P ratios in Table III are by weight.

TABLE III

| | | A | B | C | D |
|---|---|---|---|---|---|
| Time of $CaCl_2$ addition during precipitation | | 10 sec | 10 mn | 20 mn | 30 mn |
| Ca/P ratio of reagents utilised | | 1.32 | 1.28 | 1.28 | 1.34 |
| Whole initial suspension | Ca | 1.409 | 1.468 | 1.428 | 1.438 |
| | P | 1.070 | 1.150 | 1.120 | 1.070 |
| Decanted liquid | Ca | 0.026 | 0.068 | 0.040 | 0.046 |
| | P | 0.315 | 0.117 | 0.197 | 0.172 |
| Gel separated from its liquid and resuspended in water | Ca | 1.383 | 1.400 | 1.388 | 1.392 |
| | P | 0.755 | 1.033 | 0.923 | 0.898 |
| | Ca/P | 1.83 | 1.35 | 1.51 | 1.55 |

These results demonstrate that the very rapid precipitation (A) leads to a liquid medium containing less of Ca and may more phosphorus ions than the liquids of the conventional precipitations (B, C, D), on the other hand the precipitated phosphate is much more rich in calcium: Ca/P ratio = 1.83 against 1.35 to 1.55. Although from the point of view of its composition the phosphate D comes near to the lower limit (Ca/P = 1.55) of that of the invention, it nevertheless differs greatly therefrom in its physiochemical properties: it has been seen above that its decantation in 10 minutes is 89 mm, i.e., 23.5 times that of the gel A which is due to a granular structure detrimental to parenteral administration. It has also been seen that the adsorption capability of the phosphate D is poor.

When the gel of phosphate A has been subjected to two washings with 4 g/l NaCl in the manner described at the beginning of Example 1 and its suspension has been brought back to the initial volume, no more than 0.06 g P/liter is found in its clear liquid; the content of Ca therein is 0.03 g/l. The thus lowered concentration of phosphorus ions is no longer inconvenient since the precipitated phosphate has virtually the same composition as prior to the washings; in fact, a weight ratio Ca/P of 1.81 is found, against 1.83 prior to washings. In the aggregate, Ca/P = 1.8 would correspond to $PO_4.CaH.2(PO_4)_2Ca_3$.

Although the phosphate concentration in the vaccines according to the invention can vary within wide limits, it is generally virtually such that there are 1 to 2 g of Ca and 0.56 to 1.43 g of P per liter. However, and this is an advantage of the invention, the vaccine can be preserved in the form of a stable concentrate consisting of a phosphate gel of about 5 to 20 g of Ca and, respectively, about 2.8 to 14.3 g of P per liter.

I claim:

1. In the method of preparing a composition including a vaccine in an adsorbed state, by contacting an aqueous vaccine with an aqueous gel formed by pouring a calcium chloride aqueous solution having a concentration of 0.01 M to 0.5 M into an aqueous solution of dibasic sodium phosphate having a concentration of 0.01 M to 0.5 M, in a proportion substantially equal to 1 mol of $PO_4HNa_2$ per mol of $CaCl_2$, under stirring, the mixture thus obtained being further stirred while its pH is adjusted to a value of 6.8 to 7.2, and the gel formed being subsequently decanted and washed, the improvement which comprises carrying out said pouring of the calcium chloride solution as rapidly as possible within less than 3 minutes.

2. Method according to claim 1, wherein said pouring is effected within a time of less than one minute.

3. Method according to claim 1, wherein each of said aqueous solutions has a concentration of 0.05 M to 0.1 M.

4. Method according to claim 1, wherein the decantation and washing of the gel formed is carried out by removing the supernatant layer of clear liquid which forms after the gel has been left to stand until 80 to 90% of its total volume has separated as supernatant clear layer, the period of standing and the subsequent removal of clear liquid being repeated two to four times, while the clear liquid removed is replaced by a sterile aqueous solution having 4 to 9 grams NaCl per liter.

5. Method according to claim 1, wherein a first aqueous vaccine is mixed with the gel formed, the mixture is subjected to standing, and the clear supernatant liquid is separated and replaced by a sterile aqueous solution having 4 to 9 grams NaCl per liter, and then a second aqueous vaccine, immunologically different from the first one, is mixed with the gel thus treated, and the resulting mixture is again subjected to standing, removing of the clear supernatant liquid and replacing of the same by a sterile aqueous solution having 4 to 9 grams NaCl per liter.

6. Method according to claim 1, wherein the contacting of said aqueous vaccine with said gel is effected by mixing the vaccine with the solution of dibasic sodium phosphate before the solution of calcium chloride is poured thereinto.

7. The method of claim 1, wherein the vaccine is diphteria anatoxin.

* * * * *